(12) United States Patent
Iwaya (10) Patent No.: US 8,471,669 B2
(45) Date of Patent: Jun. 25, 2013

(54) DISC-TYPE COIL

(75) Inventor: Kimiaki Iwaya, Hokkaido (JP)

(73) Assignee: Cosmo Mechanics Co., Ltd., Hokkaido (JP)

( * ) Notice: Subject to any disclaimer, the term of this patent is extended or adjusted under 35 U.S.C. 154(b) by 9 days.

(21) Appl. No.: 13/386,446

(22) PCT Filed: Dec. 22, 2009

(86) PCT No.: PCT/JP2009/007149
§ 371 (c)(1),
(2), (4) Date: Jan. 23, 2012

(87) PCT Pub. No.: WO2011/077483
PCT Pub. Date: Jun. 30, 2011

(65) Prior Publication Data
US 2012/0133474 A1  May 31, 2012

(51) Int. Cl.
H01F 5/00 (2006.01)
H01F 27/06 (2006.01)
H01F 27/02 (2006.01)
H01F 27/30 (2006.01)
H01F 27/28 (2006.01)

(52) U.S. Cl.
USPC ............... 336/200; 336/65; 336/83; 336/206; 336/207; 336/208; 336/225; 336/232

(58) Field of Classification Search
USPC ............. 336/65, 83, 200, 206–208, 205, 232
See application file for complete search history.

(56) References Cited

U.S. PATENT DOCUMENTS

| | | | | |
|---|---|---|---|---|
| 3,296,474 A | * | 1/1967 | Henry-Bandot | 310/268 |
| 3,450,909 A | * | 6/1969 | Page | 310/58 |
| 3,456,144 A | * | 7/1969 | Henry-Baudot | 310/268 |
| 3,488,539 A | * | 1/1970 | Tucker | 310/268 |
| 3,500,095 A | * | 3/1970 | Keogh | 310/268 |
| RE27,187 E | * | 10/1971 | Henry-Baudot | 310/268 |
| 2006/0220774 A1 | * | 10/2006 | Skendzic | 336/200 |

FOREIGN PATENT DOCUMENTS

| | | |
|---|---|---|
| JP | 1-126142 | 5/1989 |
| JP | 01-126142 | 5/1989 |
| JP | 2009-153230 | 7/2009 |

* cited by examiner

*Primary Examiner* — Mohamad Musleh
*Assistant Examiner* — Tsz Chan
(74) *Attorney, Agent, or Firm* — Notaro, Michalos & Zaccaria P.C.

(57) ABSTRACT

In a disc-type coil that enables assuring a sufficiently high value of a flowing current to increase an output and comprises: a discoid insulating substrate 1; a conductor pattern 2 that is provided on each of both surfaces of the insulating substrate 1 so that through hole lands 22 and 23 are position on the outer circumferential side and the inner circumferential side of the insulating substrate 1, and that is arranged to be alternately folded back on both the surfaces of the insulating substrate 1; and through holes that are formed in the insulating substrate 1 and connect the through hole lands 22 and 23 of the conductor pattern 2, the plurality of through holes 6 are aligned and arranged in a radial direction c in each through hole land 23 on the inner circumferential side.

7 Claims, 10 Drawing Sheets

DISC-TYPE COIL

TECHNICAL FIELD

The present invention relates to a flat-type coil for use in an electromagnetic induction device, especially a disc-type coil that is useful when incorporated as a stator or a rotor in an induction device. More particularly, the present invention relates to improvement in through hole connections in conductor patterns of a disc-type coil.

BACKGROUND ART

In recent years, a demand for a disc-type coil having conductor patterns formed thereon by etching or press work is increasing because of a tendency of reduction in thickness of various devices. As this type of conventional disc-type coil, for example, there is known a disc-type coil having a configuration that a plurality of conductors extending on front and back surfaces of a disc-like annular insulating substrate from an inner circumferential side toward an outer circumferential side or from the outer circumferential side toward the inner circumferential side between through hole lands annularly arranged along the inner circumference and the outer circumference of the annular insulating substrate are alternately folded back in a wave pattern when connected to through holes in the through hole lands on the outer circumferential side and the through hole lands on the inner circumferential side on the front surface and the back surface of the insulating substrate, thereby constituting one coil (Patent Literature 1).
Citation List
Patent Literature
Patent Literature 1: Japanese Unexamined Patent Application Publication No. Hei 1-126142

SUMMARY OF INVENTION

Technical Problem

However, in the disc-type coil according to Patent Literature 1, since the through hole lands on the outer circumferential side and the through hole lands on the inner circumferential side of conductor patterns are annularly arranged along the outer circumference and the inner circumference of the disc-like insulating substrate, respectively, a conductor pitch must be narrowed on the inner circumferential side having a smaller diameter than that of the outer circumferential side. Therefore, on the inner circumferential side of the insulating substrate, not only a width of each conductor but also a size of each through hole land must be reduced. This tendency is particularly noticeable when increasing an output by raising the number of conductors to heighten packaging density. Further, since the through hole lands on the inner circumference must be narrowed and miniaturized, the number of through holes formed in the through hole lands is one, a hole diameter is small, a plating thickness of a conductive material or a fill ration of the conducive material in the through hole connection cannot be assured, and a value of a current that can be flowed via the through holes is restricted. Further, a width of each conductor itself is narrow on the inner circumferential side, and hence there occurs a problem that a value of a current that can be flowed through the entire conductor patterns is small. That is because a value of a maximum current flowing through the conductor patterns is restricted to an electrical resistance value at a position where each conductor pattern has the narrowest width (if a thickness is fixed).

Further, in the conventional disc-type coil, it is necessary to reduce not only a width of each conductor but also a size and width of each through hole land on the inner circumferential side of the insulating substrate, a wiring pattern in which the packaging density is hard to increase must be adopted.

As described above, a value of a current flowing in the disc-type coil having the conductor patterns formed of foil or a thin plate is lower than that of a coil obtained by winding a wire rod from the beginning. Besides, the disc-type coil according to Patent Literature 1 that not only the width of each conductor but also the dimensions of each through hole land and each through hole must be reduced on the inner circumferential side of the insulating substrate involves a problem that a high value of a flowing current cannot be assured to increase an output. Therefore, it is difficult to increase an output from the disc-type coil. Therefore, development of a disc-type coil that can assure a high value of a current flowing through each conductor pattern has been demanded.

In view of the above-described problem, it is an object of the present invention to provide a disc-type coil that can assure a sufficiently high value of a current flowing through each conductor pattern. Furthermore, it is another object of the present invention to provide a disc-type coil that can increase packaging density of each conductor pattern without suppressing a value of a current flowing through the conductor pattern.

Solution to Problem

To achieve the object, according to the present invention, there is provided a disc-type coil having on each of front and back surfaces of a discoid annular insulating substrate a conductor pattern configuring one coil by connecting a plurality of conductors, which extend from the inner circumferential side toward the outer circumferential side or from the outer circumferential side toward the inner circumferential side between through hole lands annularly arranged along the inner circumference and the outer circumference of the annular insulating substrate, to through holes in the through hole lands on the outer circumferential side and the through hole lands on the inner circumferential side to be alternately folded back in a wave pattern between the front surface and the back surface of the insulating substrate, wherein the plurality of through holes are provided in each through hole land on the inner circumferential side and aligned in a radial direction of the insulating substrate.

Here, it is preferable for the through holes to be linearly aligned. Further, it is preferable for each through hole land on the inner circumferential side to have an area expanded beyond each conductor in a radial direction and a circumferential direction of the insulating substrate.

Moreover, it is preferable for the through hole lands on the inner circumferential side of the plurality of conductors constituting the same magnetic pole of the same circuit to be aligned and arranged on a plurality of concentric circles different from each other in the radial direction of the insulating substrate.

Additionally, it is preferable that each through hole land on the inner circumferential side has an area expanded in the radial direction of the insulating substrate, an extended line of an outline thereof in the radial direction has a wedge shape that coincides with the center of the insulating substrate, and the conductor is drawn from an end portion on the outer side in the radial direction.

Further, it is preferable that the conductor pattern has a configuration that a coil half portion connected with a leading pattern and a coil half portion connected with a terminating pattern are laminated to interpose the insulating substrate therebetween, the coil half portions are connected via a connecting pattern to form one coil, and the leading pattern, the terminating pattern, and the connecting pattern are drawn to the outer side of the through hole lands on the outer circumferential side or the inner side of the through hole lands on the inner circumferential side of the conductor pattern.

Furthermore, it is preferable for the leading pattern, the terminating pattern, and the connecting pattern to be arranged on a flange portion protruding to the outside from an outer circumference of the insulating substrate.

Advantageous Effects of Invention

In the disc-type coil according to the present invention, since the plurality of through holes are formed in each through hole land on the inner circumferential side and they are aligned in the radial direction of the insulating substrate, a conduction area of the through hole connection in one through hole land is enlarged without expanding the through hole lands in the circumferential direction, and a value of a current flowing in the through hole connections can be increased in the entire through hole lands even though the through hole plating thickness is unchanged. That is, restrictions in the through holes placed on a value of the maximum current flowing through the conductor patterns can be annihilated by reducing electric resistance in the through hole connections, thereby assuring a sufficiently high value of the flowing current to increase the output. Further, since an amount of plating or the like of the conductive material in the through hole land connections in the entire through hole lands can be increased even though the conductive material have the same plating thickness in the respective through hole land connections, the amount of through hole plating required to increase the current that can be flowed in the through hole connections can be assured irrespective of the number of times of plating processing. Therefore, a plating cost can be decreased, and a price of the disc-type coil can be further reduced. Furthermore, since the space around each conductor at a position immediately close to the through hole land, which includes the through hole land, on the inner circumferential side having high arrangement density can be assured in the circumferential direction, a width of the conductor pattern and each interval between the conductors can be uniformly formed, whereby a sufficiently high value of the flowing current can be assured to increase the output.

Moreover, according to the present invention, since the plurality of through holes are linearly aligned in the radial direction of the insulating substrate, it is possible to assure in the circumferential direction the space around each conductor at the position immediately close to each through hole land, which also includes the through hole land, on the inner circumferential side where the arrangement density is high even though the land width remains the same without expanding the through hole lands in the circumferential direction, the width of each conductor pattern and each interval between the conductors can be uniformly formed, and a sufficiently high value of the flowing current can be assured to increase the output. Additionally, since the conductor pattern on the front surface side of the insulating substrate and the conductor pattern on the back surface side of the same can be formed in the line-symmetric manner, fabrication of the conductor patterns can be facilitated.

Moreover, according to the present invention, since each through hole land has the area expanded to be larger than the conductor, a reduction in electrically conductive area of each through hole land can be compensated by forming the plurality of through holes, whereby a sufficiently high value of the flowing current can be assured to increase an output.

Additionally, in the disc-type coil according to the present invention, since the through hole lands on the inner circumferential side of each conductor pattern are arranged on the plurality of concentric circles and aligned in the radial direction of the insulating substrate, these through hole lands can be arranged to be apart from each other in the radial direction on the inner circumferential side having a smaller diameter than the outer circumferential side without reducing a conductor pitch, and hence a larger space can be assured in the circumferential direction as compared with a configuration that the through hole lands on the inner circumferential side are annularly arranged on one circumference, whereby not only a width of each conductor but also a size of each through hole land can be equal to or comparable to those on the outer circumferential side. Therefore, the number of the through holes formed in each through hole land can be increased, and a size of each hole does not have to be reduced. Therefore, a requisite plating amount of a conductive material or a requisite fill ration of the conductive material for the through hole connections can be assured, and a value of the current flowing through the entire conductor patterns is not restricted by a value of the current that can be flowed via the through holes. Furthermore, since a width of the conductor itself does not have to be reduced immediately near each through hole land on the inner circumferential side, likewise, a value of the current flowing through the entire conductor patterns is not restricted by the conductor width on the inner circumferential side. Therefore, a problem that a value of the current which can be flowed through the entire conductor patterns is small can be eliminated, and a high value of the current flowing through the conductor patterns can be assured to increase an output.

Further, in the disc-type coil according to the present invention, since the through hole lands on the inner circumferential side are arranged at positions displaced toward the outer side in the radial direction of the insulating substrate, the number of the conductors can be increased to raise the packaging density without reducing not only the size of each through hole land but also the width of each conductor on the inner circumferential side, thereby increasing the output. Furthermore, the wiring shapes of the conductor patterns on the front and back surfaces of the insulating substrate electrically connected to each other at the respective through hole land connections is the line-symmetric shapes, whereby fabrication of the conductor patterns is easy.

Therefore, it is possible to manufacture an induction device of an electromagnetic induction device having a large output, e.g., a DC brushless motor.

Further, in the disc-type coil according to the present invention, since each through hole land on the inner circumferential side has the area expanded in the radial direction of the insulating substrate and a wedge shape that an extended line of the outline in the radial direction coincides with the center of the insulating substrate and it is formed in such a manner that the conductor is drawn out from the end portion on the outer side in the radial direction, the sufficiently large through hole lands on the inner circumferential side and the plurality of through holes can be formed on the insulating substrate in the radial direction at the fixed conductor intervals, and hence a value of the current flowing through the entire conductor patterns is not restricted by a value of the current flowing in the through holes while assuring a necessary amount of, e.g., plating of the through hole connections, whereby a value of the current flowing through the entire conductor patterns is not restricted by the conductor width on the inner circumferential side. Furthermore, although the insulating substrate whose size remains the same is used, the portion constituting the magnetic circuit of the conductors between the through hole lands on the outer circumferential side and the through hole lands on the inner circumferential side can be widened, thereby obtaining a higher output.

Moreover, according to the present invention, since one coil is formed by connecting the coil half portions laminated on the insulating substrate to each other by the leading pattern, the terminating pattern, and the connecting pattern drawn to the outer side of the through hole lands on the outer circumferential side or to the inner side of the through hole lands on the inner circumferential side in the conductor patterns, the high-density conductor pattern can be easily formed, and an external conductor and others can be easily and assuredly connected to this conductor pattern by, e.g., soldering, thus increasing the packaging density and reducing a manufacturing cost.

Additionally, since the wire connecting operation based on, e.g., soldering can be consolidated by arranging the leading pattern, the terminating pattern, and the connecting pattern on the flange portion outwardly protruding from the outer circumference of the insulating substrate, the coupling operation when laminating the disc-type coils can be facilitated, and the disc-type coil can be downsized. Therefore, the cost can be reduced.

DESCRIPTION OF EMBODIMENTS

A configuration of a disc-type coil according to the present invention will now be described in detail hereinafter based on embodiments shown in the drawings.

Figure 1:
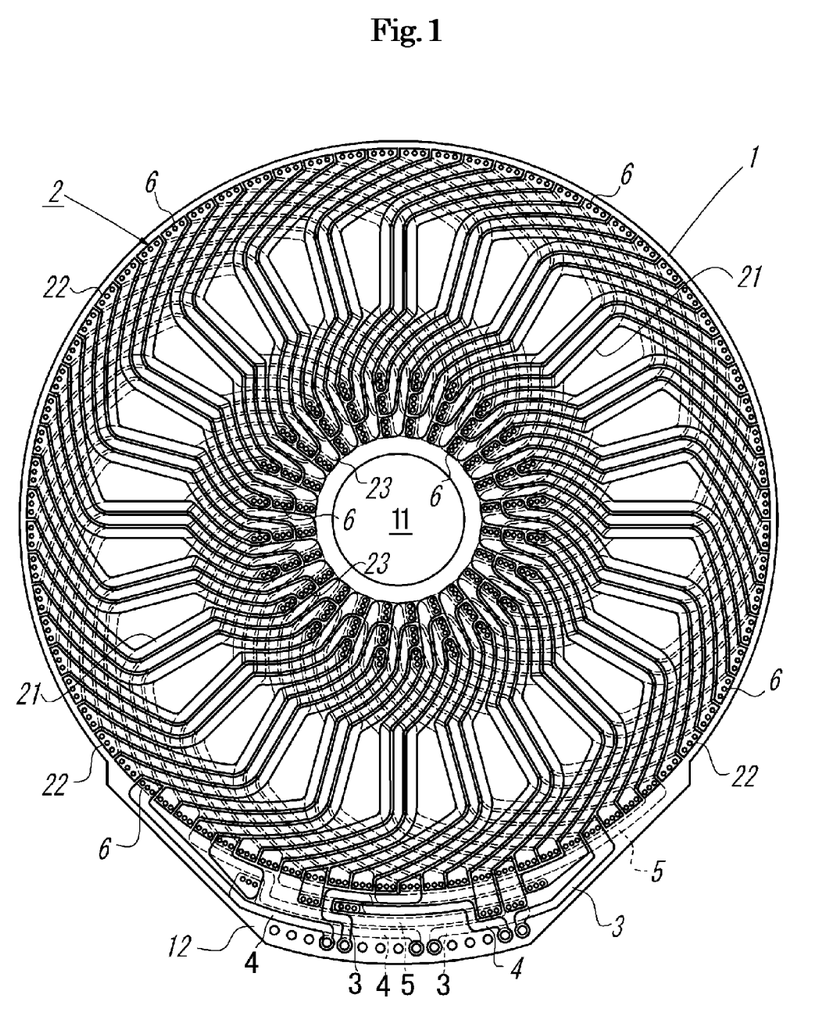
FIG. 1 is a front surface view showing an embodiment of a disc-type coil according to the present invention, where a three-phase eight-pole conductor pattern for a DC brushless motor is taken as an example to show an outwardly drawn type for drawing various kinds of terminal patterns and connecting patterns to the outer side of through hole lands on the outer circumferential side in the conductor pattern.
Figure 2:
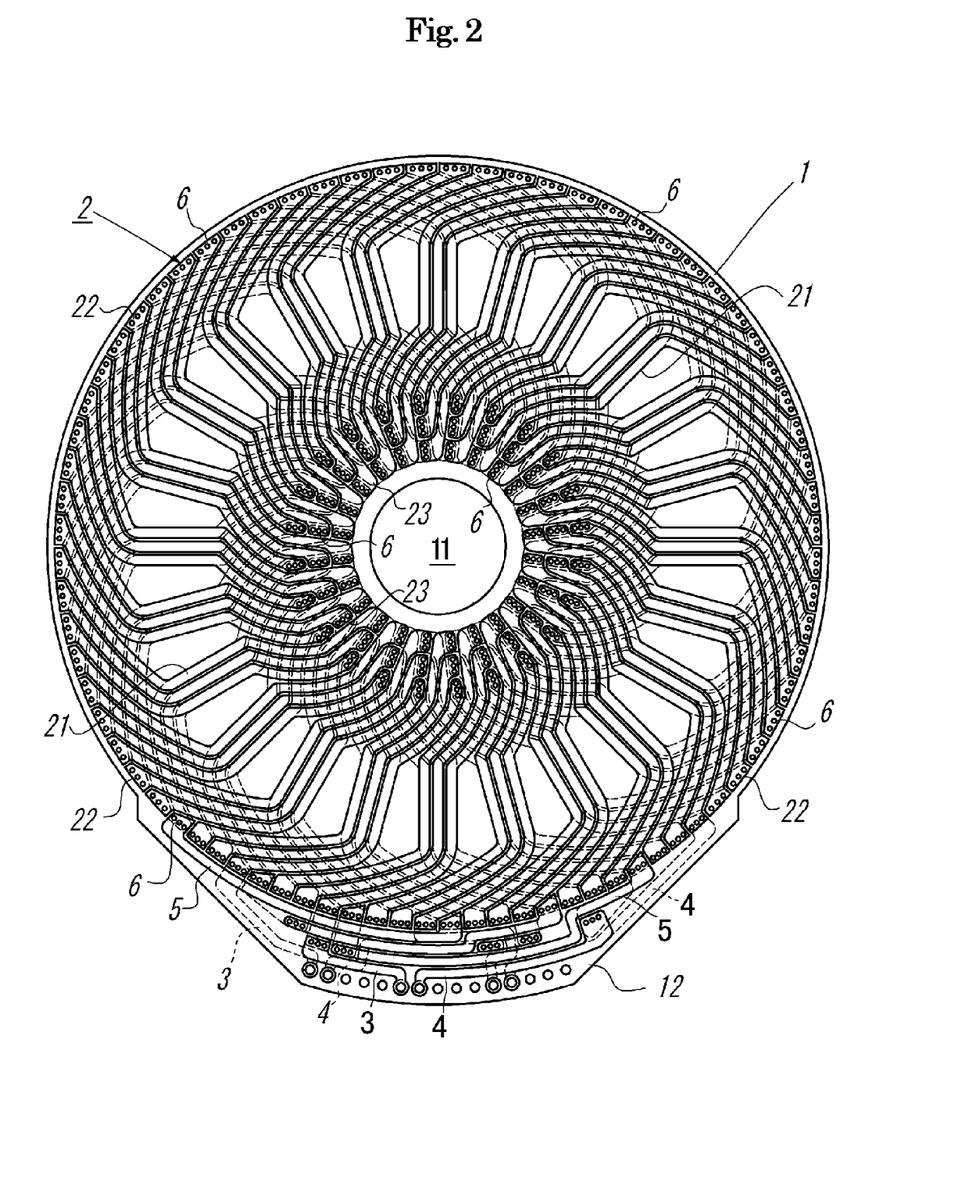
FIG. 2 is a back surface view of FIG. 1.

FIG. 1 to FIG. 6 show an embodiment that a disc-type coil according to the present invention is applied to a stator coil for a DC brushless motor. As shown in FIG. 1 and FIG. 2, this disc-type coil has an insulating substrate 1, conductor patterns 2, leading patterns 3, terminating patterns 4, connecting patterns 5, and through holes 6, and the coil is formed by using through hole lands 22 on the outer circumferential side and through hole lands 23 on the inner circumferential side to electrically connect conductors 21 of the conductor patterns 2 formed on a front surface and a back surface of the insulating substrate 1 and arranging the conductors 21 to make a circuit in a circumferential direction of the insulating substrate so as to be folded back in a wave pattern.

The insulating substrate 1 is constituted of an annular disc having a shaft hole 11 formed at a central portion thereof and made of an insulating synthetic resin material. A flange portion 12 having the leading patterns 3, the terminating patterns 4, and the connecting patterns 5 arranged thereon is integrally formed at a part of the outer circumference of this insulating substrate 1 so as to protrude toward the outside. A material of this insulating substrate 1 is not restricted in particular, and any one of a hard material and a flexible material can be selected.

The conductor pattern 2 is formed by partially dissolving and corroding, e.g., copper-based or aluminum-based foil attached to both surfaces of the insulating substrate 1 based on an etching technology (e.g., a print edge method) to be formed into a necessary pattern or by attaching a material which is obtained by punching out a sheet-like metal material into a necessary pattern based on a press technology and the like to the front and back surfaces of the insulating substrate 1. This conductor pattern 2 is formed to constitute one coil by achieving through hole connections of the plurality of conductors 21, which extend from the inner circumferential side toward the outer circumferential side or from the outer circumferential side toward the inner circumferential side between the through hole lands 22 and 23 annularly arranged along the inner circumference and the outer circumference of the annular insulating substrate 1, on the through hole lands 22 on the outer circumferential side and the through hole lands 23 on the inner circumferential side so that the conductors are alternately folded back between the front surface and the back surface of the insulating substrate 1 in a wave pattern.

Figure 3:
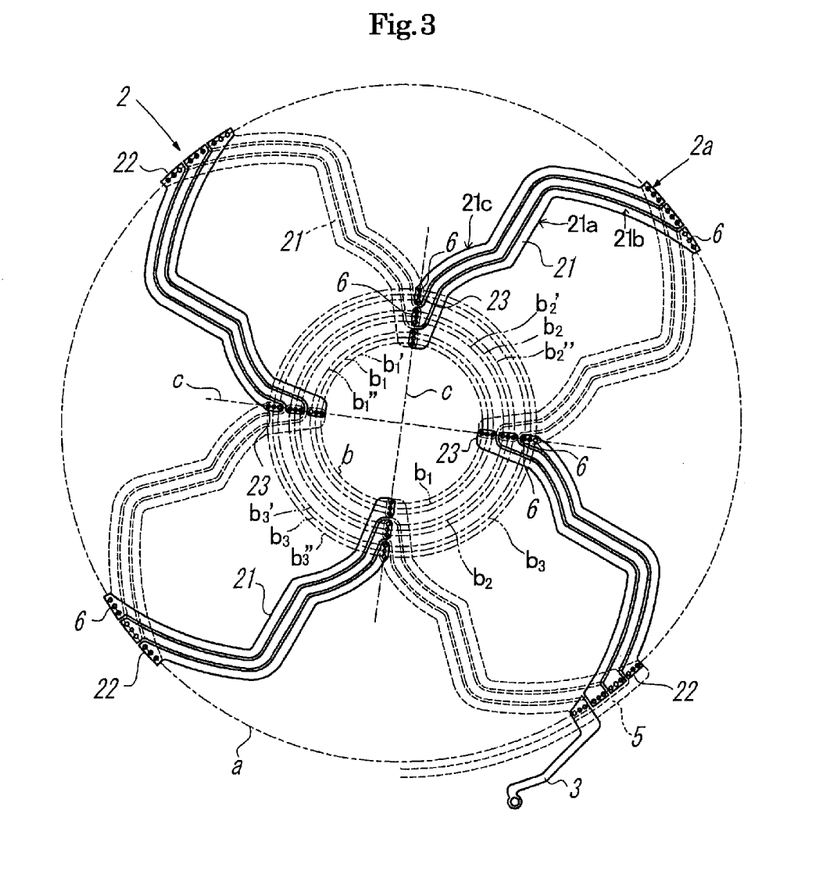
FIG. 3 is an explanatory view showing a half of one phase in the conductor pattern depicted in FIG. 1.

Here, the through hole lands 22 on the outer circumferential side are annularly arranged on one circle a at fixed intervals, and the through hole lands 23 on the inner circumferential side are aligned and arranged on a plurality of concentric circles $b_1$, $b_2$, and $b_3$ in the radial direction c of the insulating substrate 1. In this embodiment, as shown in FIG. 3, the through hole lands 23 on the inner circumferential side of the plurality of conductors 21 constituting the same magnetic pole of the same circuit are aligned and arranged on the plurality of concentric circles $b_1$, $b_2$, and $b_3$ different from each other in the radial direction c of the insulating substrate 1. That is, on the inner circumferential side of the insulating substrate, a plurality of folded portions of the same circuit are displaced and arranged at a position of one conductor folded portion in such a manner that these folded portions are aligned in the radial direction c. Further, an area of each through hole land 22 on the outer circumferential side is horizontally expanded along the circumferential direction, and a plurality of through holes 6 can be horizontally arranged on the one circle a. On the other hand, an area of each through hole land 23 on the inner circumferential side is vertically expanded in the radial direction c, and the plurality of through holes 6 can be aligned and arranged in the radial direction c. It is to be noted that circles running through the center of each through hole land 23 in the radial direction are represented as the concentric circles $b_1$, $b_2$, and $b_3$ in this embodiment for convenience of explanation, but positions through which the concentric circles $b_1$, $b_2$, and $b_3$ run do not have special meanings, and these circles represent that the plurality of through hole lands 23 are arranged to be apart from each other in the radial direction c.

Furthermore, the conductor 21 is formed into a bent linear shape having a straight portion 21a provided at the annular center constituting a magnetic circuit and circular portions 21b and 21c drawing gentle arcs between the straight portion 21a and the through hole lands 22 and 23 at both ends. Moreover, widths and conductor intervals of the conductors 21 are uniformly set by equalizing centers of curvature of the respective circular portions 21b and 21c of the plurality of conductors 21 constituting the same magnetic pole of the same circuit on the same surface of the insulating substrate 1. As a result, narrow positions that restrict a value of a maximum current flowing through the conductor pattern 2 can be prevented from being formed in some of the conductors 21 while maintaining the conductor intervals constant.

Figure 5:
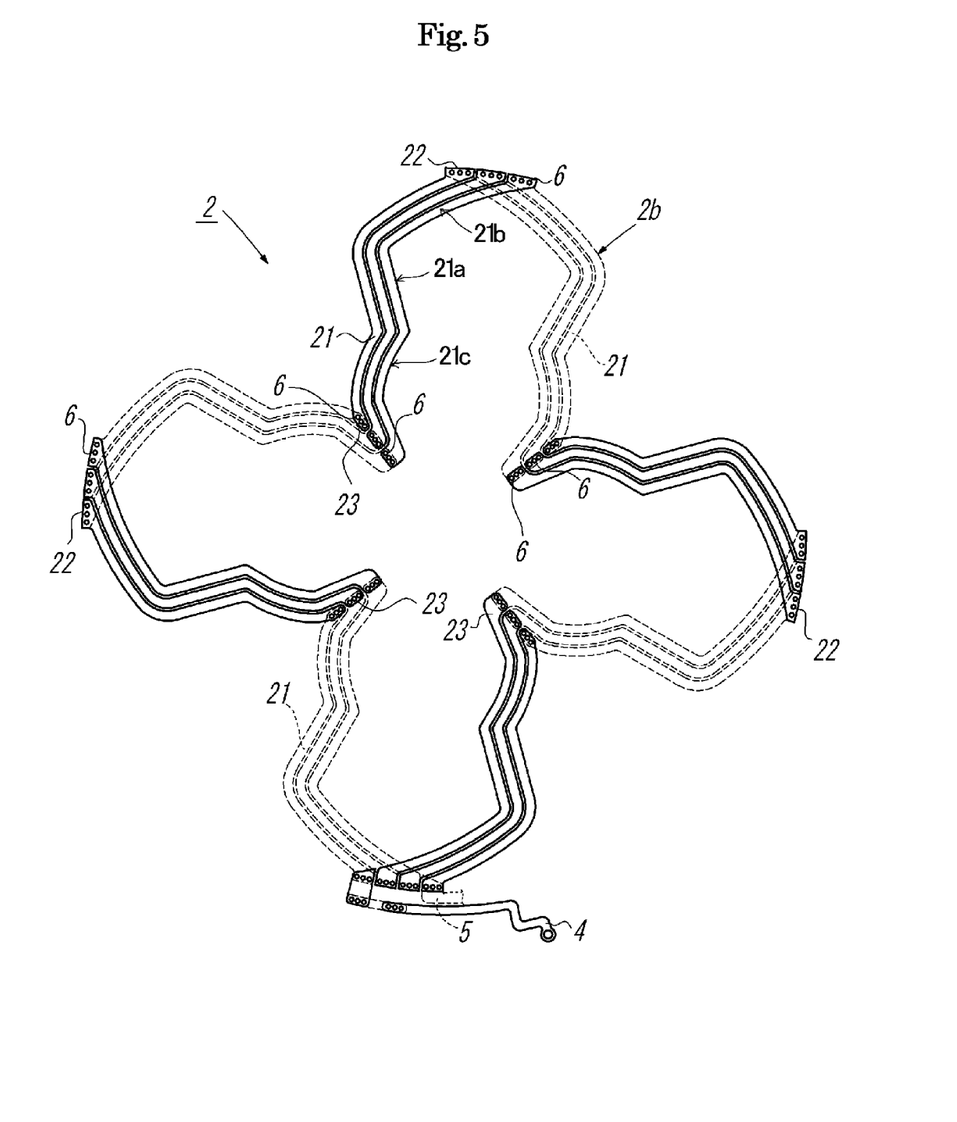
FIG. 5 is an explanatory view showing a remaining half of the one phase in the conductor pattern depicted in FIG. 1.
Figure 6:
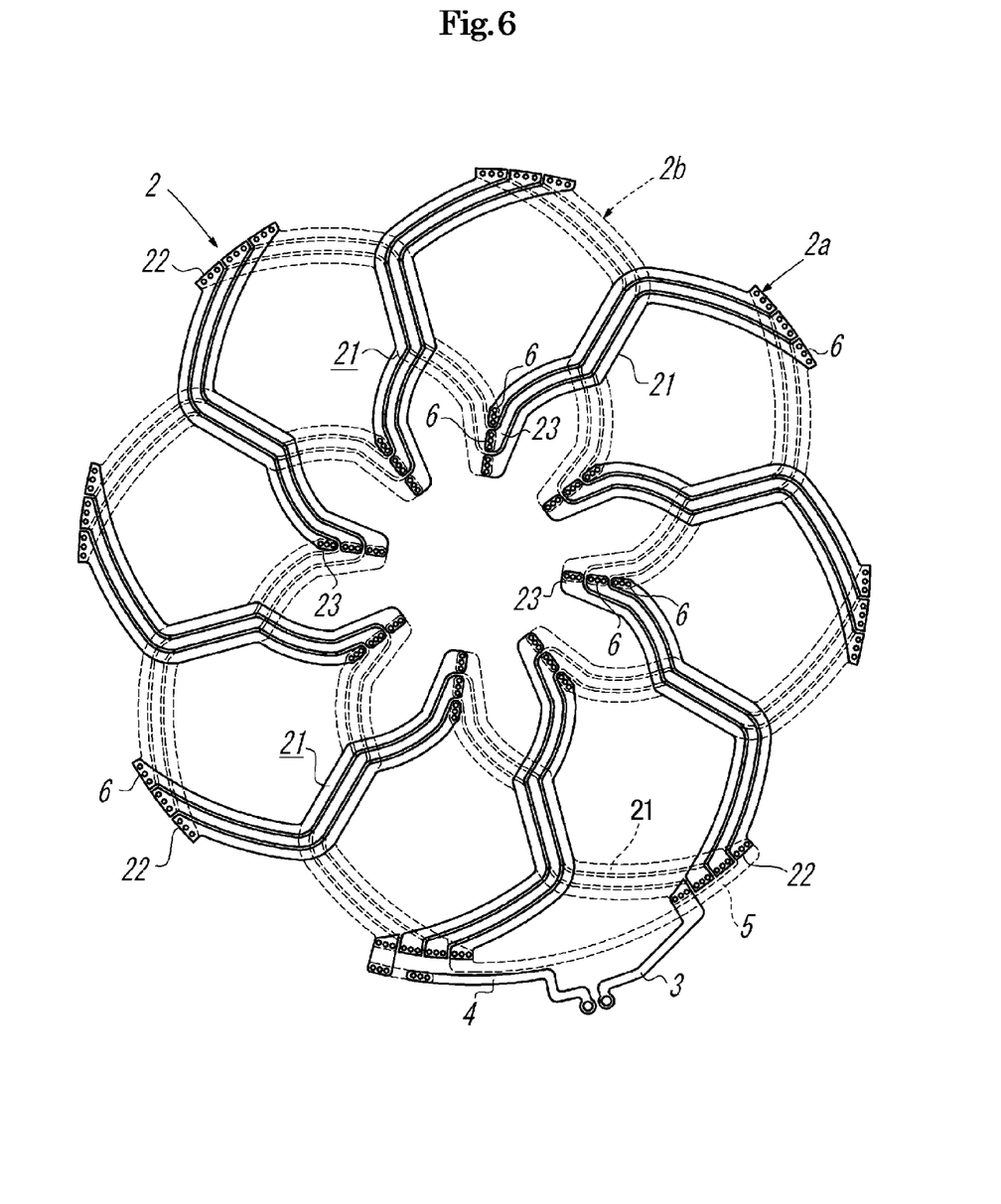
FIG. 6 is an explanatory view showing the entire conductor pattern corresponding to one phase which is a combination of FIG. 3 and FIG. 5.

It is to be noted that, in this conductor pattern 2, a coil half portion 2a that is continuous via the through holes 6 depicted in FIG. 3 and a coil half portion 2b that is continuous via the through holes 6 depicted in FIG. 5 are laminated and connected to each other through the connecting pattern 5, thereby forming a coil winding shape shown in FIG. 6. Additionally, this coil winding shape is determined as one unit, and three units are laminated in phase, whereby a three-phase eight-pole conductor pattern is formed. When the one coil half portion 2b is arranged to be shifted a ½ pitch from the other coil half portion 2a corresponding to a half circuit, each interlinear groove of the one pattern 2a can be covered with lines of the other pattern 2b, thereby avoiding magnetic flux leakage.

Here, the leading pattern 3 is connected to the through hole land 22 on the outer circumferential side placed at a leading end of the one coil half portion 2a of the conductor pattern 2, and it is drawn to the flange portion 12 of the insulating substrate 1. The terminating pattern 4 is connected to the through hole land 22 on the outer circumferential side placed at a terminating end of the other coil half portion 2b of the conductor pattern 2, and it is drawn to the flange portion 12 of the insulating substrate 1. The connecting pattern 5 is connected to the through hole land 22 on the outer circumferential side placed at a terminating end of the one coil half portion 2a of the conductor pattern 2 and the through hole land 22 on the outer circumferential side placed at a leading end of the other coil half portion 2b of the conductor pattern 2, and it is drawn to the flange portion 12 of the insulating substrate 1. These leading pattern 3, terminating pattern 4, and connecting pattern 5 are formed integrally with the conductor pattern 2. In the conductor pattern 2 according to this embodiment, since each leading pattern 3, each terminating pattern 4, and each connecting pattern 5 are concentrated on the flange portion 12 that protrudes from the outer circumference of the insulating substrate 1 and is provided at one position, a coupling operation when laminating the disc-type coils can be facilitated, and downsizing can be realized.

Figure 4:
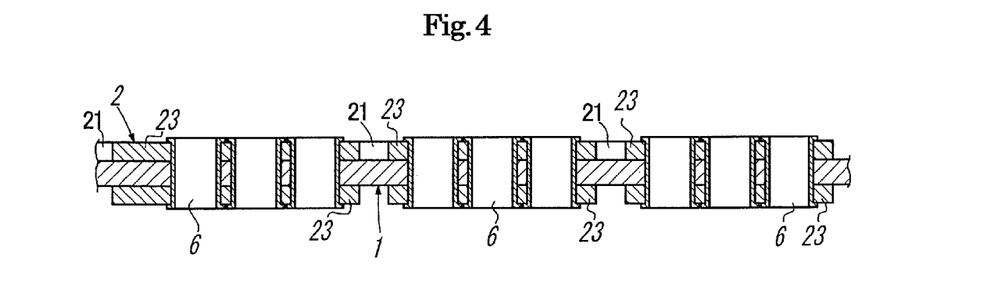
FIG. 4 is an enlarged longitudinal cross-sectional view showing through hole lands on the inner circumferential side of the conductor pattern and a through hole connection state in FIG. 3 along a C back.

As shown in FIG. 4, the through holes 6 achieve electrical conduction between the conductor pattern 2 formed on the front surface of the insulating substrate 1 and the conductor pattern 2 formed on the back surface of the same by covering inner peripheral surfaces of the holes pierced in the respective through hole lands 22 and 32 on the front and back surfaces of the insulating substrate 1 with a coat of a conductive material or by filling the holes with a conductive material, thereby electrically connecting both the conductor patterns 2 at the through hole lands 22 and 23. In this embodiment, the plurality of, e.g., three through holes 6 are provided in accordance with each of the through hole lands 22 and 23. It is to be noted that, in each through hole land 22 on the outer circumferential side of the insulating substrate 1, the plurality of, i.e., three through holes 6 are arranged on the single circle a of the insulating substrate 1 and aligned in the circumferential direction of the insulating substrate 1 in this embodiment. Further, in the through hole lands 23 on the inner circumferential side of the conductor pattern 2, the plurality of through holes 6 are arranged on the plurality of concentric circles $b_1$, $b_{1'}$, $b_{1''}$, $b_2$, $b_{2'}$, $b_{2''}$, $b_3$, $b_{3'}$, and $b_{3''}$ and aligned in the radial direction c of the insulating substrate 1.

According to this embodiment, the two coil half portions 2a and 2b of the conductor pattern 2 are laminated to form one coil, the leading patterns 3, the terminating patterns 4, and the connecting patterns 5 for connection are drawn to the outer side of the through hole lands 22 on the outer circumferential side of each conductor pattern 2. Therefore, since the high-density conductor patterns 2 are readily and assuredly connected, manufacture at a low cost can be realized.

Moreover, in the disc-like insulating substrate 1, the through hole lands 23 on the inner circumferential side of each conductor pattern 2 are prevented from being arranged on the single circle and the through hole lands 23 on the inner circumferential side of each conductor pattern 2 are arranged on the plurality of concentric circles $b_1$, $b_2$, and $b_3$ and retracted and aligned in the radial direction c, the width and the intervals (insulating gaps) of each conductor pattern 2 on the inner circumferential side where arrangement density is high can be maintained constant. Therefore, a sufficiently high value of a flowing current can be assured to increase an output. It is to be noted that radiation performance can be enhanced when the width and the intervals of each conductor pattern 2 are maintained constant, thereby avoiding performance degradation with time due to heat.

Additionally, when the plurality of through holes 6 are provided in accordance with each of the through hole lands 22 and 23 of the conductor pattern 2, an electrical conduction area in each through hole 6 is expanded. Therefore, the restriction on a value of the maximum current flowing through each conductor pattern 2 in the through holes 6 can be eliminated, whereby a sufficiently high value of the flowing current can be assured to increase an output. It is to be noted that the plurality of through holes 6 are linearly aligned along the radial direction c of the insulating substrate 1 in each through hole land 23 on the inner circumferential side of the conductor pattern 2, whereby the expansion of the conductor pattern 2 in the circumferential direction can be avoided. Therefore, the width and the intervals of each conductor pattern 2 on the inner circumferential side where the arrangement density is high can be more assuredly maintained constant, and hence a sufficiently higher value of the flowing current can be secured to increase an output.

Further, when each through hole land 22 or 23 having the plurality of through holes 6 provided therein in the conductor pattern 2 has the expanded area, a reduction in conduction area due to boring of the through holes 6 can be compensated.

Therefore, a sufficiently higher value of the flowing current can be assured to increase an output. It is to be noted that, since the area of each through hole land 23 on the inner circumferential side of the conductor pattern 2 is expanded in the radial direction c of the insulating substrate 1, there occurs no problem in maintaining the width and the intervals of the conductor pattern 2 constant.

Figure 7:
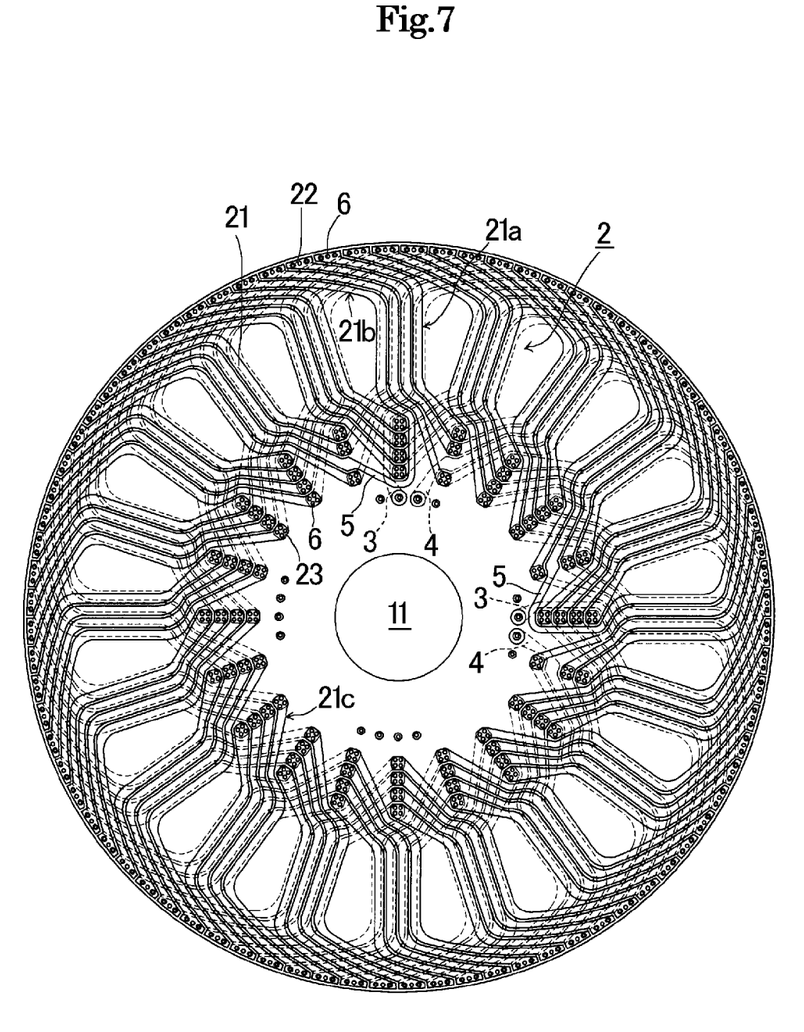
FIG. 7 is a front surface view showing another embodiment of a disc-type coil according to the present invention, where a two-circuit 10-pole conductor pattern is taken as an example to show an inwardly drawn type for drawing a leading pattern, a terminating pattern, and a connecting pattern to the inner side of through hole lands on the inner circumferential side.
Figure 8:
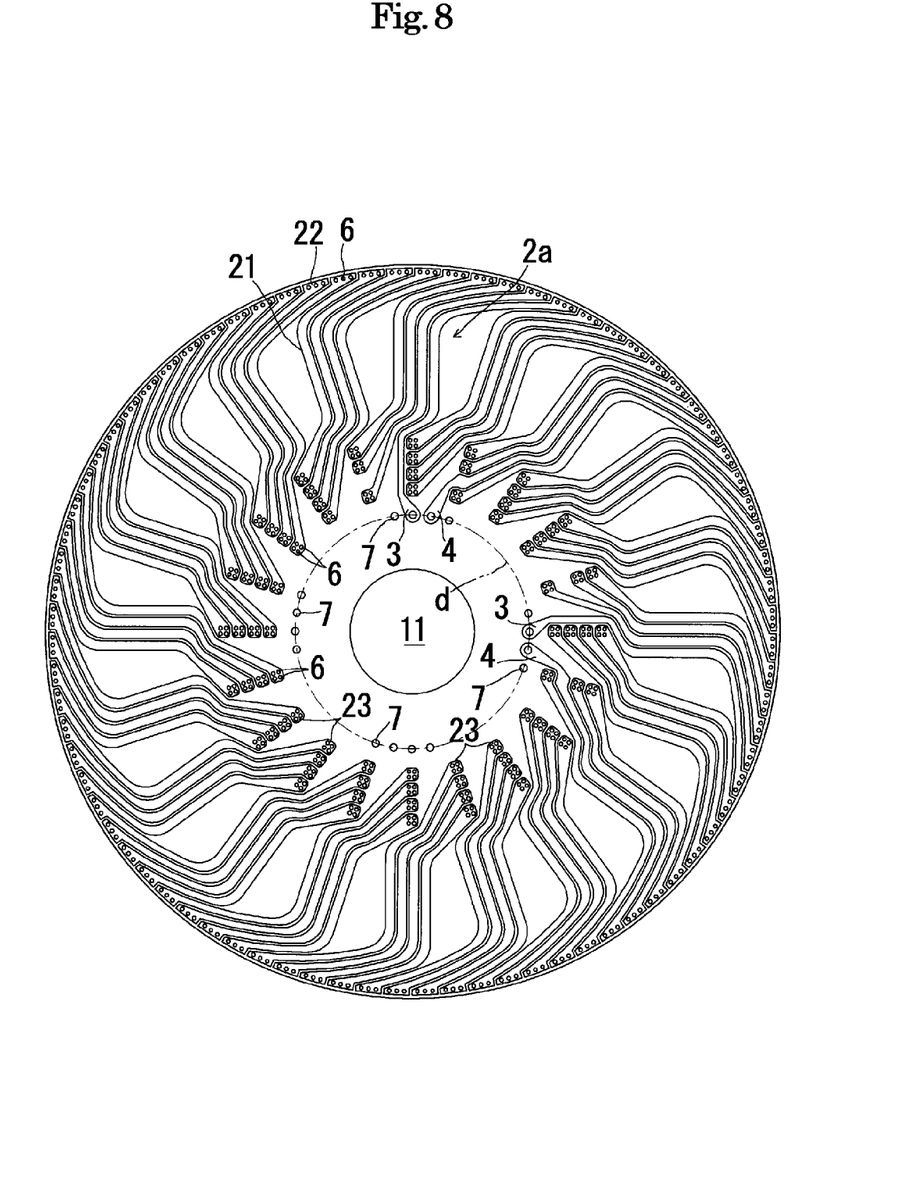
FIG. 8 is an explanatory view showing the conductor pattern on the front surface side alone in the disc-type coil depicted in FIG. 7.
Figure 9:
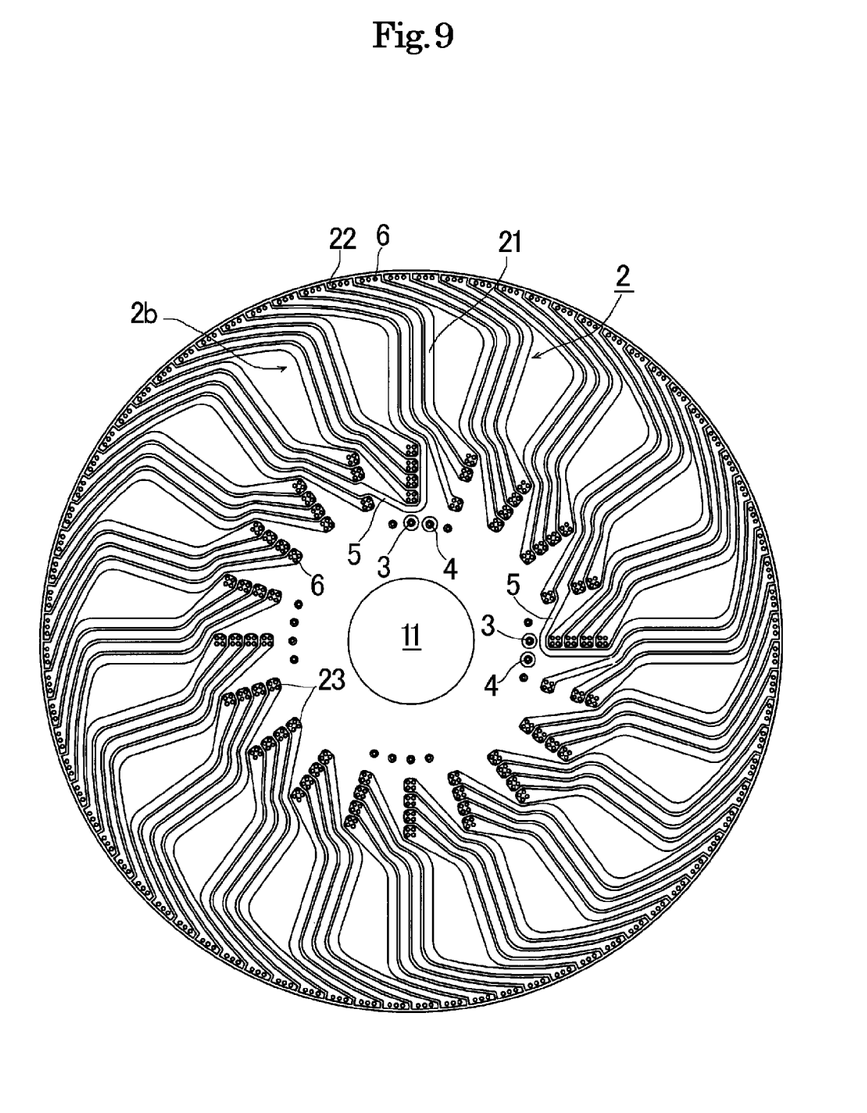
FIG. 9 is an explanatory view showing the conductor pattern on the back surface side alone in the disc-type coil depicted in FIG. 7.

Further, the leading pattern 3, the terminating pattern 4, and the connecting pattern 5 can be drawn to the inner circumferential side of the insulating substrate 1 or, specifically, these patterns can be drawn to the inner side beyond the through hole lands 23 on the inner circumferential sides. For example, FIG. 7 to FIG. 9 show an example where each conductor pattern 2 for two circuits is formed as an embodiment of a disc-type coil which is of an inwardly drawn type. In the disc-type coil according to this embodiment, four holes 7 for through holes are formed at 90° intervals on a circumference d on the inner side beyond through hole lands 23 on the inner circumferential side. Furthermore, a leading pattern 3 and a terminating pattern 4 are connected to two in the four holes, respectively. On the other hand, a connecting pattern 5 is drawn and wired in the conductor pattern 2 to connect a terminating end of a coil half portion 2a corresponding to a half of the wiring pattern 2 for one circuit to a leading end of a coil half portion 2b (which is displaced to deviate 36° from the former coil half portion) corresponding to the remaining half of the same. In this embodiment, in FIG. 9, since the terminating end of the coil half portion 2a corresponding to the half of one circuit and the leading end of the coil half portion 2b corresponding to the remaining half function as through hole lands on the outer circumferential side, a wiring line is installed along other conductors 21 toward the through hole lands 23 on the inner circumferential side to connect the terminating end to the leading end, and it is also installed toward the through hole lands 22 on the outer circumferential side while being drawing to bypass the inner side of the through hole lands 23 on the inner circumferential side. At this time, each connecting pattern 5 is formed on a surface on the opposite side of a surface where the leading pattern 3 and the terminating pattern 4 are formed so as not to cross the leading pattern 3 and the terminating pattern 4. In this embodiment, assuming that the surface where the leading pattern 3 and the terminating pattern 4 are formed is a front surface, the connecting pattern 5 is formed on the back surface side. It is to be noted that each through hole land 23 on the inner circumferential side has a substantially square shape, and four through holes 6 are provided to be aligned in two lines along a radial direction c of an insulating substrate 1. Furthermore, since the plurality of through hole lands 23 on the inner circumferential side of the conductors 21 constituting the same pole of the same circuit are arranged on a plurality of concentric circles and aligned in the radial direction c of the insulating substrate 1, these through hole lands 23 can be arranged to be apart from each other along the radial direction on the inner circumferential side having a smaller diameter than that of the outer circumferential side without reducing a conductor pitch. Therefore, as compared with the configuration that the through hole lands 23 on the inner circumferential side are annularly arranged on one circumference, a large space can be assured in the circumferential direction, and not only a width of each conductor 21 but also a size of each through hole land 23 can be formed to be equal or comparable to those on the outer circumferential side.

As described above, in case of the disc-type coil which is of the type that the leading pattern 3, the terminating pattern 4, and the connecting pattern 5 are drawn to the inner circumferential side of the insulating substrate 1, since the space produced on the inner circumferential side of the insulating substrate 1 can be utilized to form the respective patterns 3, 4, and 5, there can be obtained an advantage that a space is not consumed because the flange portion 12 does not protrude to the outside of the insulating substrate 1. Moreover, when an output is increased, the space produced on the inner circumferential side is enlarged as a coil radius is increased, and hence this space can be effectively utilized, which is effective for compactification.

Figure 10:
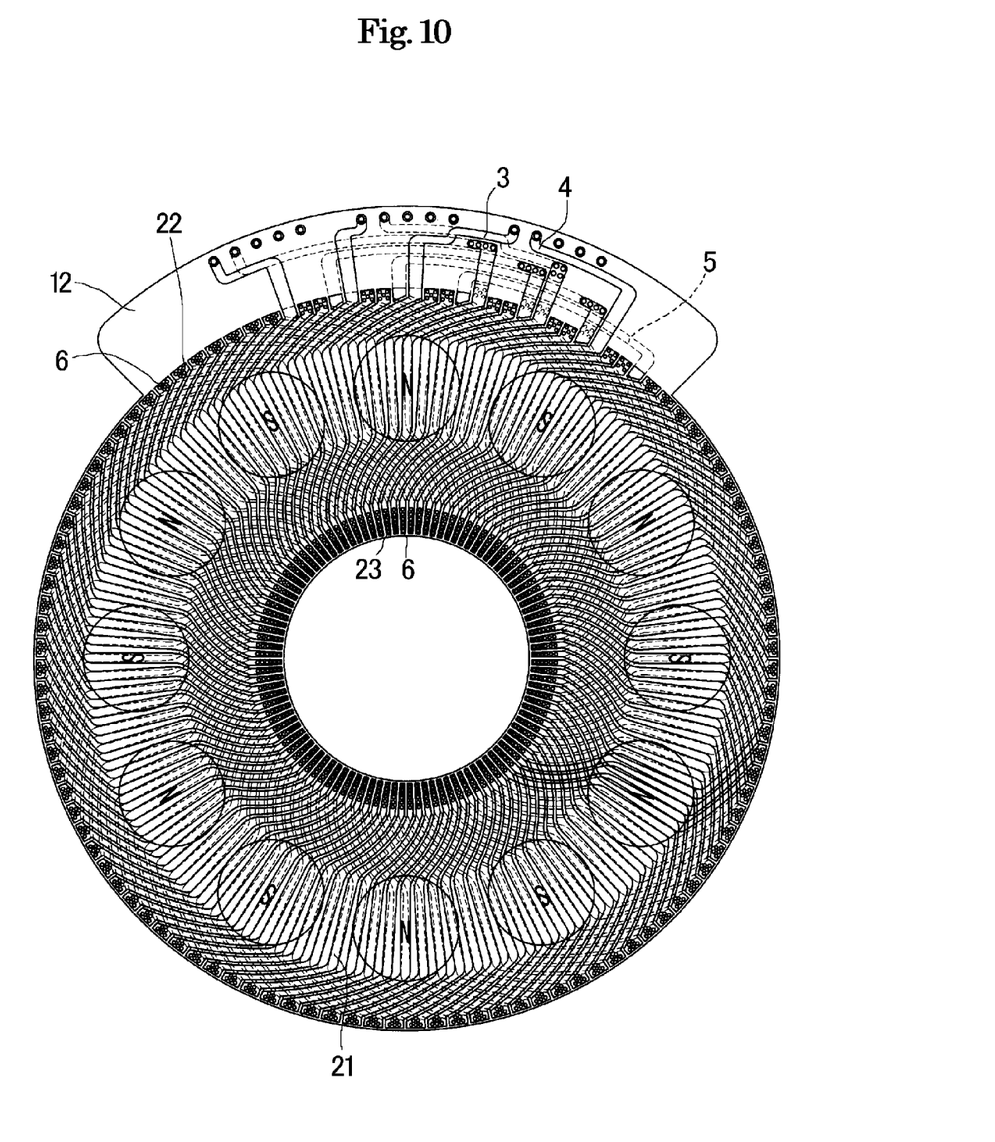
FIG. 10 is a front surface view showing another embodiment of through hole lands on the inner circumferential side of a disc-type coil according to the present invention, where a three-phase 12-pole conductor pattern which is of an outwardly drawn type for a DC brushless motor is taken as an example to be explained.
Figure 11:
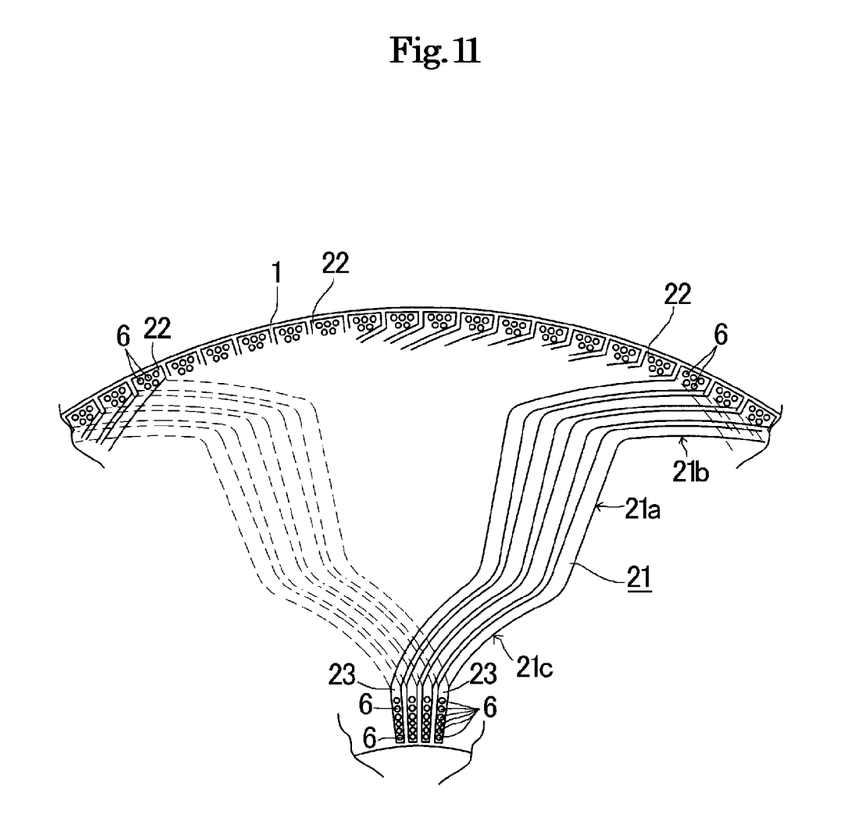
FIG. 11 is an enlarged partial explanatory view of the conductor pattern depicted in FIG. 10.

FIG. 10 and FIG. 11 show another embodiment of the disc-type coil according to the present invention. This disc-type coil has a configuration that a plurality of through holes 6 are provided in each through hole land 23 on the inner circumferential side and aligned in a radial direction c of an insulating substrate 1, and an electrical conduction area of a through hole connection in one through hole land 23 on the inner circumferential side is increased without expanding the through hole land 23 on the inner circumferential side in the circumferential direction, whereby a value of a current flowing through the through hole connections can be increased in the entire through hole lands 23 on the inner circumferential side even though a through hole plating thickness is unchanged. Specifically, as shown in FIG. 11, each through hole land 23 on the inner circumferential side according to this embodiment has an area expanded in the radial direction c of the insulating substrate 1, an extended line of an outline in the radial direction has a wedge shape that coincides with the center of the insulating substrate 1, and a wiring line is installed to draw each conductor 21 from an end portion on the outer side in the radial direction. That is, the area of the through hole land 23 on the inner circumferential side is expanded in the radial direction of the insulating substrate so that fixed conductor intervals can be formed and a sufficient dimension of the through hole land can be obtained insofar as a width in the circumferential direction can be allowed at a maximum, and it is formed into a vertically long inverted trapezoid shape that can be fitted in a region between regions serving as two conductor intervals partitioned by lines radially running from the center of the insulating substrate 1 along the radial direction c so that the fixed conductor intervals can be obtained. That is, the through hole land 23 on the inner circumferential side is formed into a substantial wedge shape whose width is gradually narrowed toward the inner circumferential side of the insulating substrate. Although the through hole lands 23 on the inner circumferential side according to this embodiment are annularly arranged in the circumferential direction along the inner circumference of the insulating substrate 1, they are expanded in the radial direction c of the insulating substrate 1, thereby forming the plurality of through holes. For example, in this embodiment, when the six through holes 6 are formed, a requisite amount of plating and others for the through hole connections is assured so that a value of a current flowing through the entire conductor patterns is not restricted by a value of a current flowing in the through holes. Further, since the wiring is installed in such a manner that the conductors 21 are drawn from outer ends of the through hole lands 23 on the inner circumferential side in the radial direction, a width of each conductor 21 near each through hole land 23 on the inner circumferential side is equal to that of the through hole land 23 on the inner circumferential side, whereby the conductor width can eliminate the restriction on the value of the current flowing through the entire conductor patterns. It is to be noted that the five through holes 6 are provided by arranging the through holes 6 in two rows in each through hole land 22 on the outer circumferential side in this embodiment.

In this embodiment, as compared with the disc-type coil according to the embodiment depicted in FIG. 1 to FIG. 9, when the insulating substrate 1 having the same size is used, a large distance can be assured between the through hole lands 22 on the outer circumferential side and the through hole lands 23 on the inner circumferential side, straight portions 21a of the conductors provided at the center of an annular portion constituting the magnetic circuit can be elongated, thereby increasing an output.

It is to be noted that each of the foregoing embodiments is just a preferred example of the present invention, but the present invention is not restricted thereto, and it can be modified and carried out in many ways without departing from the scope of the invention. For example, in the embodiment shown in FIG. 1 to FIG. 6, the number of the through holes 6 provided in the through hole lands 22 on the outer circumferential side forming a line on the one circle a is equal to the number of the through holes 6 on the inner circumferential side aligned on one circle a, but the same number of or fewer through holes on the outer circumferential side may be provided on a plurality of concentric circles, i.e., two or more rows in accordance with an increase in the number of the through holes 6 on the inner circumferential side to magnify an amount of plating and others. In any case, a value of the maximum current flowing through each conductor pattern can be prevented from being restricted to a value of electrical resistance in the through hole connections by increasing a total amount of plating or an area of the through holes 6 in the respective through hole lands 22 and 23 to exceed an area of the conductors 21, or specifically increasing the same to be approximately 1.5-fold.

Furthermore, the description has been mainly given as to the example where the plurality of through hole lands 23 on the inner circumferential side are linearly arranged in the radial direction c of the insulating substrate, but the present invention is not restricted thereto in particular. The through hole lands 23 on the inner circumferential side do not have to be precisely linearly arranged, and they may be aligned on a slightly curved arc in some cases. In this case, a requisite amount of plating of a conductive material or requisite filler content of the conductive material for the through hole connections can be assured, and a width of each conductor 21 and a conductor interval can be fixed near the through hole lands 23 on the inner circumferential side. Moreover, in case of arranging the plurality of through holes 6 in the radial direction c of the insulating substrate, likewise, the through holes 6 do not have to be precisely linearly arranged, and essential effects are not negated even if the through holes 6 are aligned on a slightly curved arc or in two rows or arranged in a staggered pattern. Moreover, when the area of the through hole lands 23 on the inner circumferential side can be expanded, a hole diameter of each through hole 6 can be enlarged to increase an amount of plating or the like and to assure a requisite amount of the same, and hence a single large-diameter through hole 6 can be adopted in the embodiment shown in FIG. 1 to FIG. 9. As a matter of course, to increase a plating area, magnifying the number of the through holes 6 is preferable.

Additionally, although the conductor pattern 2 described in this embodiment is a preferred mode, the present invention is not restricted thereto. It is needless to say that the present invention can be applied to any conductor patterns other than that shown in the drawings as long as the relationship between arrangement of the through holes 6 and arrangement of the through hole lands 23 according to the present invention is maintained. Further, the conductor pattern 2 is not restricted to three phases and three circuits, and two units (two circuits) or four units (four circuits) or above can be adopted.

Industrial Applicability

The disc-type coil according to the present invention can be used in the field of electromagnetic induction devices such as a rotor coil or a stator coil in an induction machine like a DC brushless motor, and a thin DC brushless motor having a large output can be realized.

REFERENCE SIGNS LIST 1 insulating substrate
2 conductor pattern
2a, 2b coil half portion
3 leading pattern
4 terminating pattern
5 connecting pattern
6 through hole
23 through hole land on the inner circumferential side
a one circle for through hole lands 22 on the outer circumferential side
$b_1$, $b_2$, $b_3$ a plurality of concentric circles
$b_1$, $b_{1'}$, $b_{1''}$, $b_2$, $b_{2'}$, $b_{2''}$, $b_3$, $b_{3'}$, $b_{3''}$ a plurality of concentric circles on which the plurality of though holes are arranged in the radial direction of the insulating substrate
c radial direction of the insulating substrate

The invention claimed is:

1. A disc-type coil having on each of front and back surfaces of a discoid annular insulating substrate a conductor pattern configuring one coil by connecting a plurality of conductors, which extend from the inner circumferential side toward the outer circumferential side or from the outer circumferential side toward the inner circumferential side between through hole lands annularly arranged along the inner circumference and the outer circumference of the annular insulating substrate, to through holes in the through hole lands on the outer circumferential side and the through hole lands on the inner circumferential side to be alternately folded back in a wave pattern between the front surface and the back surface of the insulating substrate, wherein the plurality of through holes are provided in each through hole land on the inner circumferential side and aligned in a radial direction of the insulating substrate.

2. The disc-type coil according to claim 1, wherein the through holes are linearly aligned.

3. The disc-type coil according to claim 1, wherein each through hole land on the inner circumferential side has an area expanded beyond each conductor in a radial direction and a circumferential direction of the insulating substrate.

4. The disc-type coil according to claim 1, wherein the through hole lands on the inner circumferential side of the plurality of conductors constituting the same magnetic pole of the same circuit are aligned and arranged on a plurality of concentric circles different from each other in the radial direction of the insulating substrate.

5. The disc-type coil according to claim 1, wherein each through hole land on the inner circumferential side has an area expanded in the radial direction of the insulating substrate, an extended line of an outline in the radial direction has a wedge shape that coincides with the center of the insulating substrate, and the conductor is drawn from an end portion on the outer side in the radial direction.

6. The disc-type coil according to claim 1, wherein the conductor pattern has a configuration that a coil half portion connected with a leading pattern and a coil half portion connected with a terminating pattern are laminated to interpose the insulating substrate therebetween, the coil half portions are connected via a connecting pattern to form one coil, and the leading pattern, the terminating pattern, and the connecting pattern are drawn to the outer side of the through hole lands on the outer circumferential side or the inner side of the through hole lands on the inner circumferential side of the conductor pattern.

7. The disc-type coil according to claim 6, wherein the leading pattern, the terminating pattern, and the connecting pattern are arranged on a flange portion protruding to the outside from an outer circumference of the insulating substrate.

\* \* \* \* \*